US011000943B2

(12) United States Patent
Reynolds

(10) Patent No.: US 11,000,943 B2
(45) Date of Patent: May 11, 2021

(54) WORK BENCH

(71) Applicant: Greg Reynolds, Mount Pleasant, SC (US)

(72) Inventor: Greg Reynolds, Mount Pleasant, SC (US)

( * ) Notice: Subject to any disclaimer, the term of this patent is extended or adjusted under 35 U.S.C. 154(b) by 0 days.

(21) Appl. No.: 15/975,803

(22) Filed: May 10, 2018

(65) Prior Publication Data

US 2019/0344424 A1  Nov. 14, 2019

(51) Int. Cl.
*B25H 1/04* (2006.01)
*B25H 1/16* (2006.01)
*B60R 9/06* (2006.01)

(52) U.S. Cl.
CPC ............... *B25H 1/04* (2013.01); *B25H 1/16* (2013.01); *B60R 9/06* (2013.01)

(58) Field of Classification Search
CPC .......... B25H 1/04; B25H 1/0007; B25H 1/08; B25H 1/16; B60R 9/06; A47B 57/30; A47B 57/32; A47B 57/34; A47B 57/40; A47B 57/404; A47B 57/406; A47B 57/402
See application file for complete search history.

(56) References Cited

U.S. PATENT DOCUMENTS

| 1,337,886 A | 4/1920 | DeBakey | |
|---|---|---|---|
| 1,727,032 A | 9/1929 | Guignon, Jr. | |
| 4,018,340 A * | 4/1977 | Gold | A47F 7/175 211/44 |
| 4,819,900 A * | 4/1989 | Funk | A47B 57/44 108/108 |
| 5,381,738 A * | 1/1995 | Meyer | A47B 5/00 108/108 |
| 5,775,655 A * | 7/1998 | Schmeets | A47B 5/00 108/115 |
| 5,820,004 A | 10/1998 | Lane | |
| 6,029,833 A * | 2/2000 | Yeh | A47F 5/0838 108/108 |
| 6,240,856 B1 * | 6/2001 | Paskey | B25H 1/12 108/146 |

(Continued)

FOREIGN PATENT DOCUMENTS

FR      429931 A  * 10/1911  ............. A47B 57/34

OTHER PUBLICATIONS

Translation of FR 429931 from espacenet (Year: 2020).*

*Primary Examiner* — Daniel J Rohrhoff
(74) *Attorney, Agent, or Firm* — Ernest B. Lipscomb, III; Riley Pope & Laney, LLC

(57) ABSTRACT

A work bench which is easily disassembled for storage or moving to a new location and may be used as a wall mounted version, a freestanding version and a tailgate version. A workbench frame is connected to a support surface by a pair of mounting standards spaced apart from one another and mounted to the support surface. The mount standards allow for the vertical adjustment of the workbench frame to the desired height. The workbench frame comprises a frame connector and a table top support flange. The work bench frames are the supports for the bench work surface. The table top support is a flange with holes to allow for connection to the work surface. Atop of the table angle top is a work surface. There is also provided a bench support extension connected to the work bench used as a support for material larger than the work surface.

7 Claims, 9 Drawing Sheets

(56) References Cited

U.S. PATENT DOCUMENTS

| | | |
|---|---|---|
| 6,347,592 B1 | 2/2002 | Gessert |
| 6,824,183 B1 * | 11/2004 | Hodge ............... B60P 3/14 |
| | | 108/44 |
| 7,152,261 B2 | 12/2006 | Jackson |
| 7,481,254 B2 * | 1/2009 | Welsh ............... B25H 1/04 |
| | | 144/286.1 |
| 7,604,027 B2 | 10/2009 | Thatcher |
| 9,102,286 B1 | 8/2015 | Deming et al. |
| 9,216,507 B2 * | 12/2015 | Kirchgessner ....... B25H 1/02 |
| 2007/0029011 A1 * | 2/2007 | Thatcher ............ B25H 1/16 |
| | | 144/286.5 |
| 2009/0127413 A1 * | 5/2009 | Herron, III ........ A47B 95/008 |
| | | 248/220.21 |
| 2015/0027972 A1 * | 1/2015 | Andersson .......... A47B 57/485 |
| | | 211/94.01 |
| 2020/0164781 A1 * | 5/2020 | Pascarella ......... B60N 3/001 |

* cited by examiner

WORK BENCH

BACKGROUND OF THE INVENTION

1. Field of the Invention

The present invention relates to work benches. More specifically, this invention relates to a modular work bench that may be modified to be used in a variety of ways, such as attached to a wall, freestanding or attached to the tailgate of a vehicle and easily disassembled for storage and transportation.

2. Description of Related Art

Broadly speaking, a workbench is essentially a table that is sufficiently strong to support a workpiece or device for a user to work on. Historically work benches have been designed for specific uses such as for sawing or planing wood which a cabinetmaker might use. Other work benches are designed for other specific purposes which are as imaginative as any particular need. While there are a variety of work benches available most are as stationary or cumbersome as they are bulky and/or designed to be used in a single location or for a singular purpose. For example, where the workbench is a wall mounted unit the work bench may be permanent and take up a sizeable amount of space. The prior art is replete with these types of work benches. Other work benches have been designed to include folding components that allow the work bench to be stored in a relatively small space. While some of these work benches are useful for specific purposes, there remains a need for a work bench that is easily disassembled and stored in a small space and further is versatile enough to be used in different environments.

SUMMARY OF THE INVENTION

In accordance with the present invention, there is provided a work bench which is easily disassembled for storage or moving to a new location and may be adapted for use in various embodiments. The work bench of this invention may be altered to be used in several versions, i.e., a wall mounted version, a freestanding version and a tailgate version. One of the preferred embodiments of this invention is the wall mounted version. A pair of work bench support frames are connected to a vertical surface using fasteners or by a pair of standards spaced apart from one another and directly mounted to the vertical surface. The wall mounted version of the work bench, as well as the other embodiment, is constructed of a durable material, such as steel. The wall standards are preferably flat shaped with repeating clips allowing the work bench frames to hang therefrom. The repeating clips allow for the vertical adjustment of the work bench frames to the desired height. The wall mount standards may be attached to the wall or other vertical surface in any convenient manner. Keyhole slots allow for easy removal of the support frames or standards to a different location or to storage.

Each work bench frame has a vertical flange used to connect the frame to the wall support standard, a table top support flange, a cross-member hanger and a cross-member. As normally used, the work bench includes two frames that are interchangeable. The work bench frames are the supports to which the bench work surface is attached. Optionally, adjustable support legs may be added to increase the workbench capacity. The support frame allows for direct attachment to a vertical surface using fasteners. Each support frame also has a series of slots that allows for the connection to the support standard.

The table top support flange has holes to allow for support and attachment of the work surface to the frame. The table top support is joined to the support wall standard or attached to a vertical surface and is stabilized by a cross-member. The table top support flange also contains small sharp tabs that provide grip to the work surface to avoid sliding on the frame. Atop of the table top support flange is a planar work surface which may be a single piece of material, e.g., wood, or may comprise several sections which fit together to form the work bench work surface.

It is often the case that when using a work bench the working surface is not as large as the material to be worked on creating an awkward situation where the material being worked on is unbalanced. There is provided a bench support extension used as a support for material larger than the work surface; thus, imposing no limit on the size of the workpiece that may be held on the work surface. The bench support extension is connected to the table top support. The bench support extension has horizontal and vertical adjustment. The bench support extension adjusts vertically using a rod and a pair of fasteners that support the workpiece support extension member. While the bench support extension is described as being used for the wall mounted version of the work bench, it is understood that the extension can be used with the alternative work bench embodiments, namely the freestanding embodiment and the tailgate embodiment.

It is therefore the general object of the present invention to provide a work bench which may be sufficiently versatile to be used in different environments.

Another object of the present invention is to provide a work bench that is capable of handling a workpiece that is larger than the work bench surface.

Yet another object of the present invention is providing a work bench that is easy to set up and disassemble for storage in a small space.

Other objects, features and advantages of the invention will be apparent to those skilled in the art from the following detailed description of the invention taken in conjunction with the drawings.

BRIEF DESCRIPTION OF THE DRAWINGS

Having described the invention in general terms, reference will now be made to the accompanying drawings, which are not necessarily drawn to scale, and wherein.

DESCRIPTION OF THE PREFERRED EMBODIMENTS

The present inventions now will be described more fully hereinafter with reference to the accompanying drawings, in which preferred embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art. Like numbers refer to the elements throughout.

Figure 1:
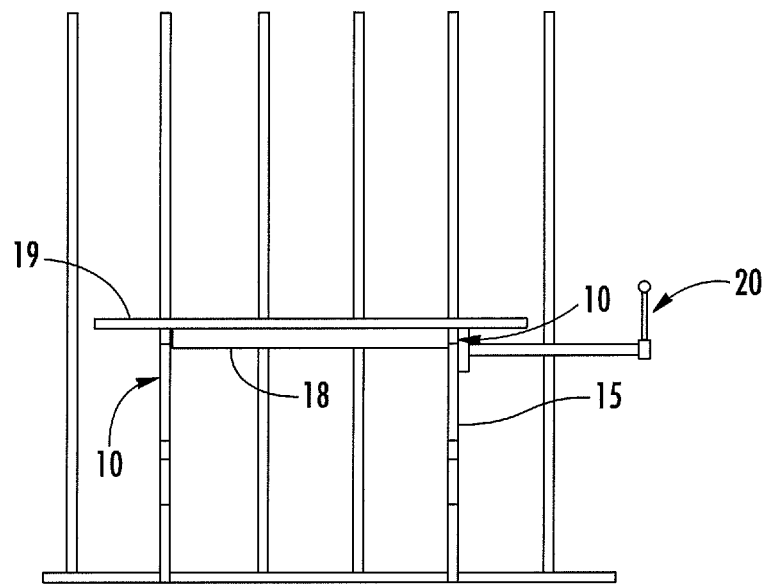
FIG. 1 is a front view of the wall mounted workbench embodiment of the present invention illustrating the frame of the work bench attached to wall studs showing the work surface on the frame.
Figure 2:
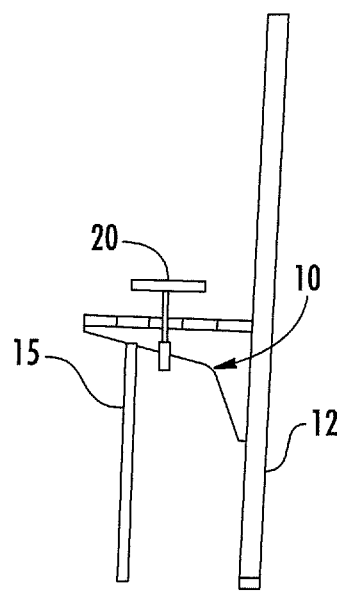
FIG. 2 is a side view of the wall mounted workbench embodiment of the present invention illustrating the frame of the work bench attached to wall studs.
Figure 3:
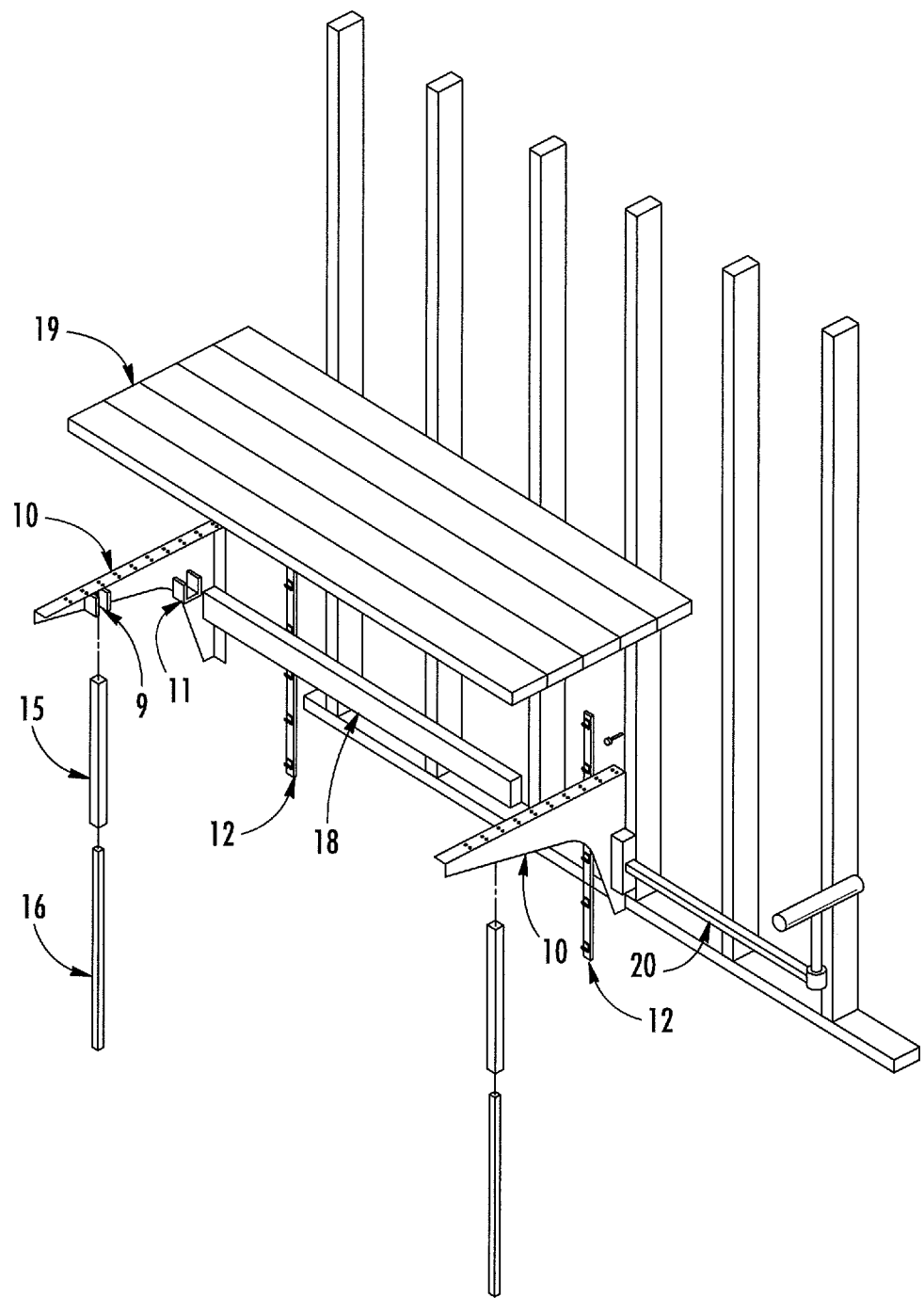
FIG. 3 is a front perspective view of the unassembled wall mounted work bench of the present invention.
Figure 4:
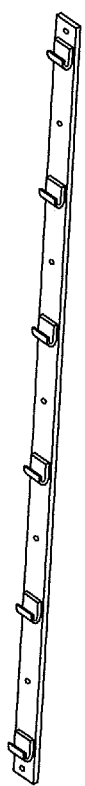
FIG. 4 is a perspective view of a wall mount support standard illustrating repeating clips for accommodating the frame of the work bench for use in the present invention.
Figure 5:
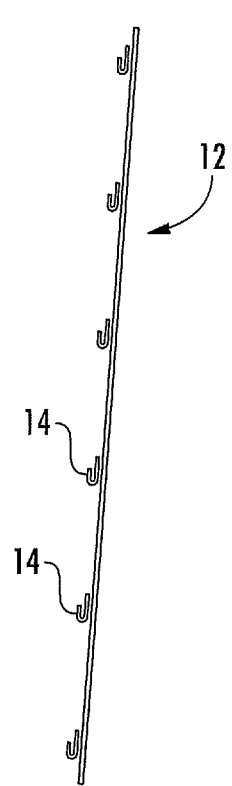
FIG. 5 is side view of a wall mount support standard illustrating a repeating clip for accommodating the frame of the work bench for use in the present invention.
Figure 6:
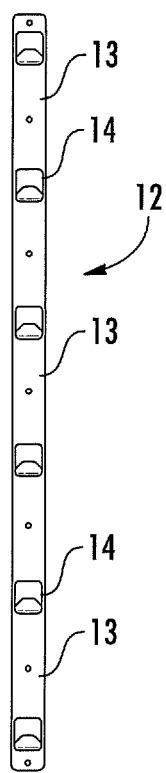
FIG. 6 is a front view of a wall mount support standard illustrating the keyhole slots for easy removal of the wall mount support standard from a vertical surface.

The modular work bench of this invention is found in a variety of embodiments. One of the preferred embodiments is the wall mounted version. The frames 10 of the wall mounted embodiment are shown in FIG. 1 in an assembled condition mounted to the studs of a wall. In FIG. 3 the wall mounted work bench frames 10 are shown in an unassembled condition. The frames 10 are constructed of a durable material, preferably steel. To connect frame 10 to a wall, a wall mount support standard 12 is attached to a support surface, e.g., a wall, a stud or any other vertical surface strong enough to support the work bench. As shown in FIG. 2 and FIG. 3 a pair of wall mounted support standards 12 spaced apart from one another are attached directly to the wall studs but it should be understood that the support standards 12 may be attached other suitable vertical surfaces. As shown in FIG. 4 wall mount support standards 12 have a flat shape and repeating clips 14 that allow frame 10 to hang from wall mount support standard 12. The repeating clips 14, shown most clearly in FIG. 5, allow for the vertical adjustment of the workbench frames 10 to the desired height. The wall mount support standard 12 may be attached to the wall or other vertical surface in any convenient manner but as shown in FIG. 6, keyhole slots 13 allow for easy removal to a different location or to storage when attached directly to a support surface.

Figure 7:
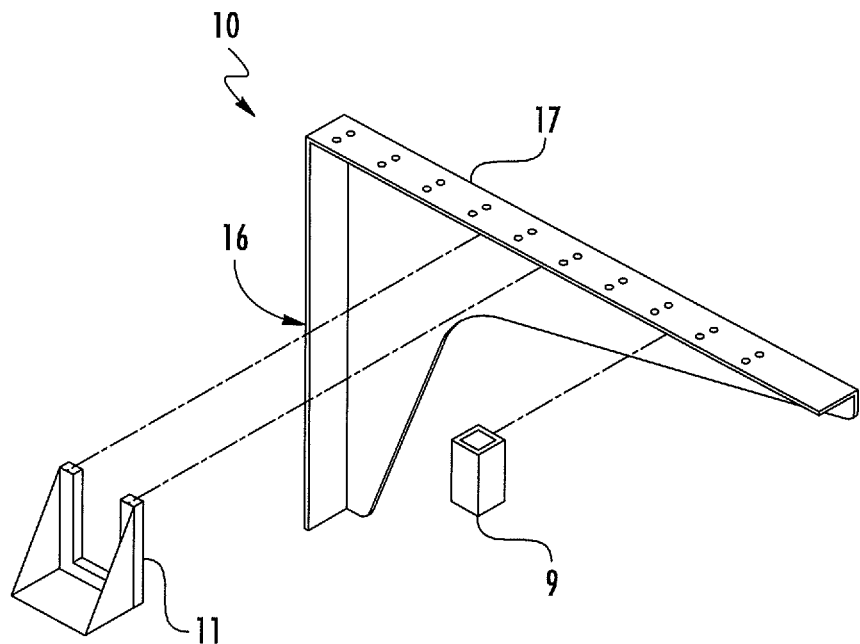
FIG. 7 is an isometric view of the vertical flange of the work bench of the present invention illustrating the keyhole slots and horizontal slots.
Figure 8:
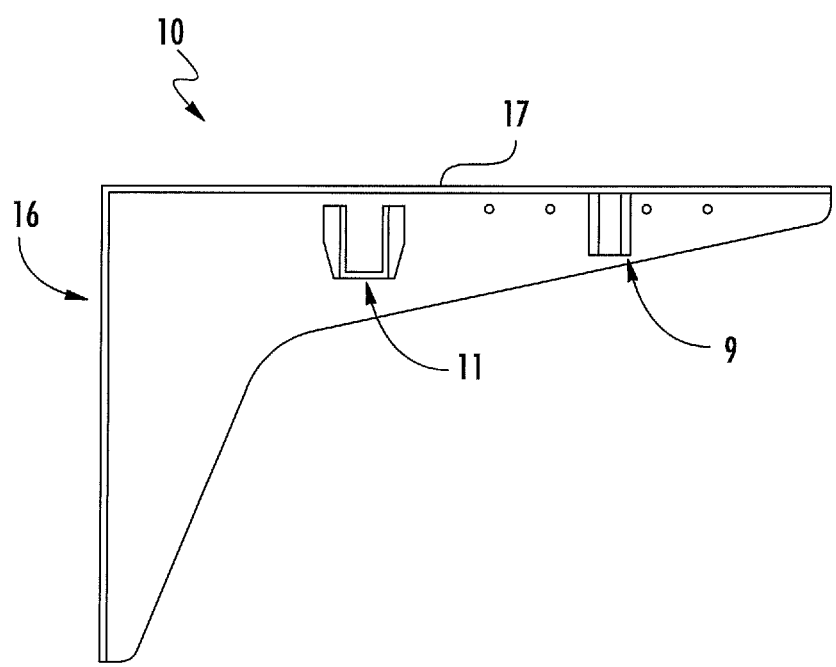
FIG. 8 is a side view of the vertical flange used to form the work bench of the present invention.

As shown in FIG. 7 and FIG. 8, the workbench frame 10 has a vertical flange 16 which is used to connect frame 10 to the wall support standard 12 through a series of slots, a table top support flange 17 to support a work surface. The vertical flange 16 and the table top support flange 17 are jointed together at one end, such as by welding and stability is added to the frame 10 by support member 8. The frame 10 also includes support leg sleeve 9 and a cross-member hanger 11. As normally used the work bench includes two frames 10. However, if desired, more than two frames may be used where stability of the work surface may be an issue. The right and left work bench frames 10 are interchangeable. The workbench frames 10 are the support by which the work surface 19 is attached. The workbench frames 10 connect to the wall or to the support standard 12 via slots in vertical flange 16 as shown in FIG. 7. Leg support sleeve 9 connects to support member 8 and allows for the insertion of vertical adjustable legs 15 as shown in FIG. 3. Cross-member hanger 11 as shown in FIG. 8 attaches to support member 8 and allows for connection between frames 10 using cross-member 18 as shown in FIG. 3. The work surface and frames may be easily removed from the wall mount support standards and the frames 10, placed into storage or moved to a different location.

In FIG. 7, frame 10 is shown dissembled. Top flange 17 of frame 10 has holes to allow for connection to the work surface 19 as shown in FIG. 3. Top flange 17 also contains small sharp tabs that provide grip to the work surface 19 to avoid sliding on frame 10. Vertical flange 16 contains horizontal slots to accept the clips from support standard 12 and keyhole slots for attachment to a suitable support surface. Atop of the table top support flange 17 is a planar work surface 19. The entire work surface may be a single piece of material, e.g., wood, or may comprise several sections which fit together on the table top support flange 17.

Figure 9:
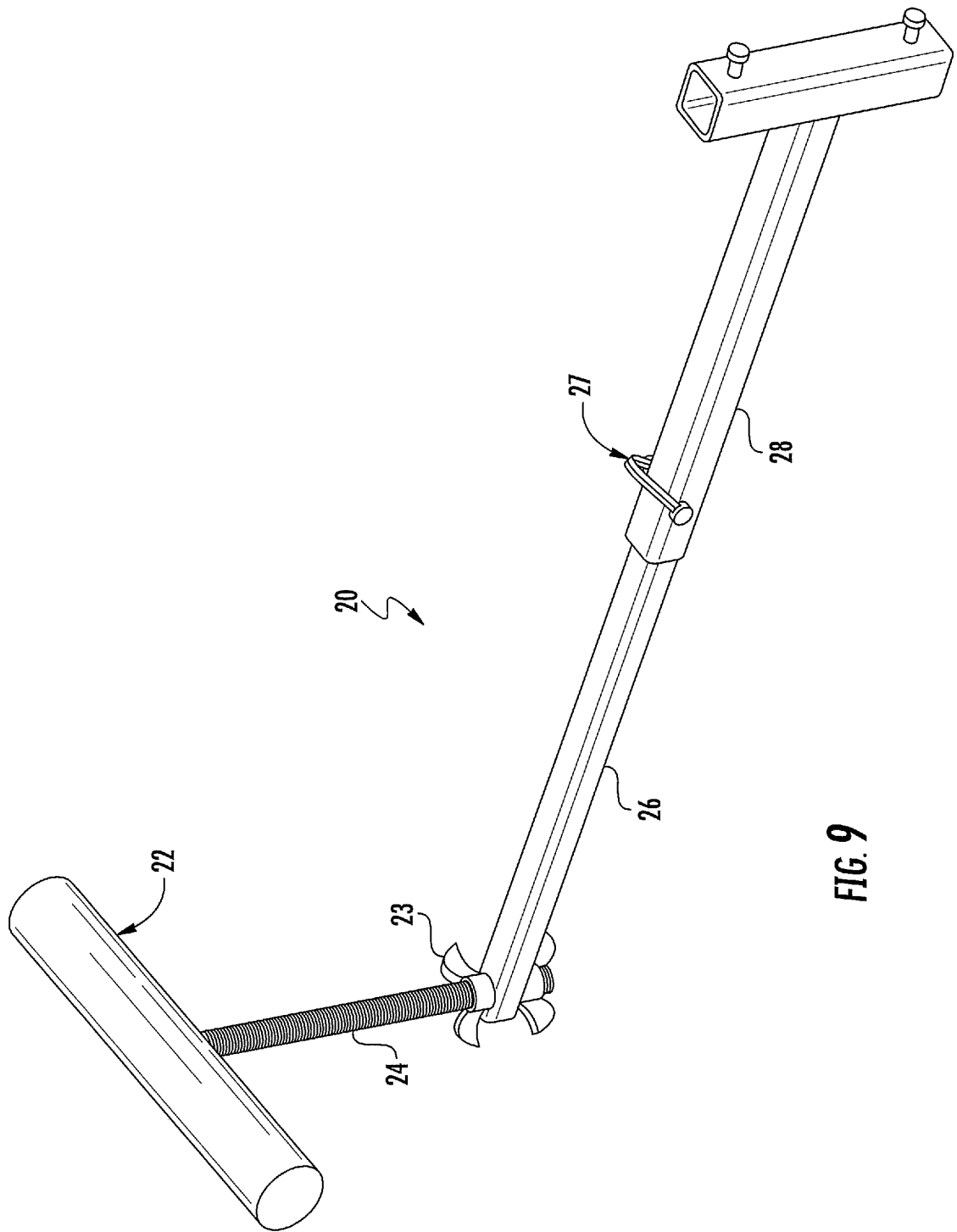
FIG. 9 is a perspective view of the assembled bench support extension of the present invention.

It is often the case that when using a work bench the working surface is not as large as the material to be worked on creating an awkward situation where the material being worked on is unbalanced. Thus, as one of the objectives of this invention a bench support extension is provided, such as the one shown in FIG. 9. Bench support extension 20 is used as a support for material longer than the work surface of 19 thus imposing no limit on the size of the workpiece that may be held on the work surface. Bench support extension 20 can be connected to frame 10 via a pair of fasteners 21. The bench support extension 20 has horizontal and vertical adjustment. The bench support extension 20 adjusts horizontally via a pair of nesting tubes 26, 28 and is secured using retainer 27. The bench support extension 20 adjusts vertically using rod 24 and a pair of nuts 23 that supports workpiece support member 22. Bench support extension 20 can be used with the alternative work bench assemblies described hereinafter.

Figure 10:
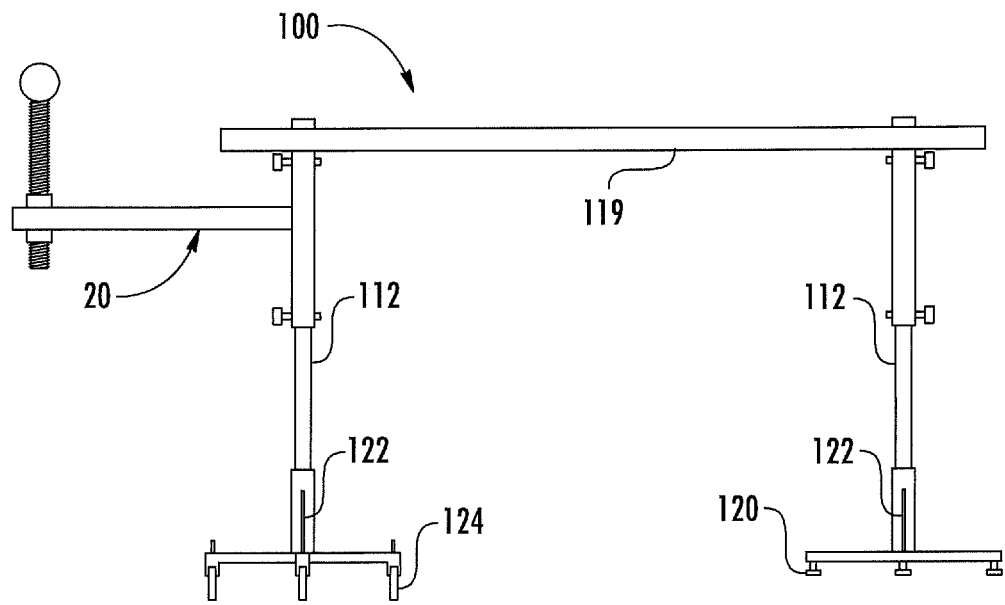
FIG. 10 is a front view of an alternative embodiment work bench of the present invention showing the workbench as a freestanding unit.
Figure 11:
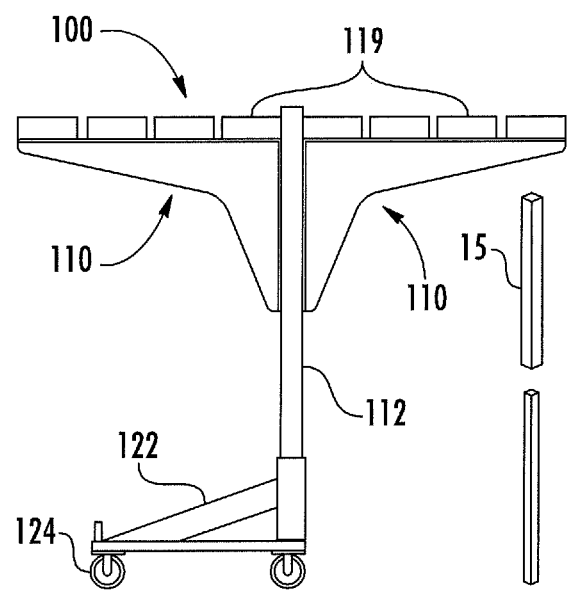
FIG. 11 is a side view of an alternative embodiment work bench of the present invention showing the workbench as a freestanding unit.
Figure 12:
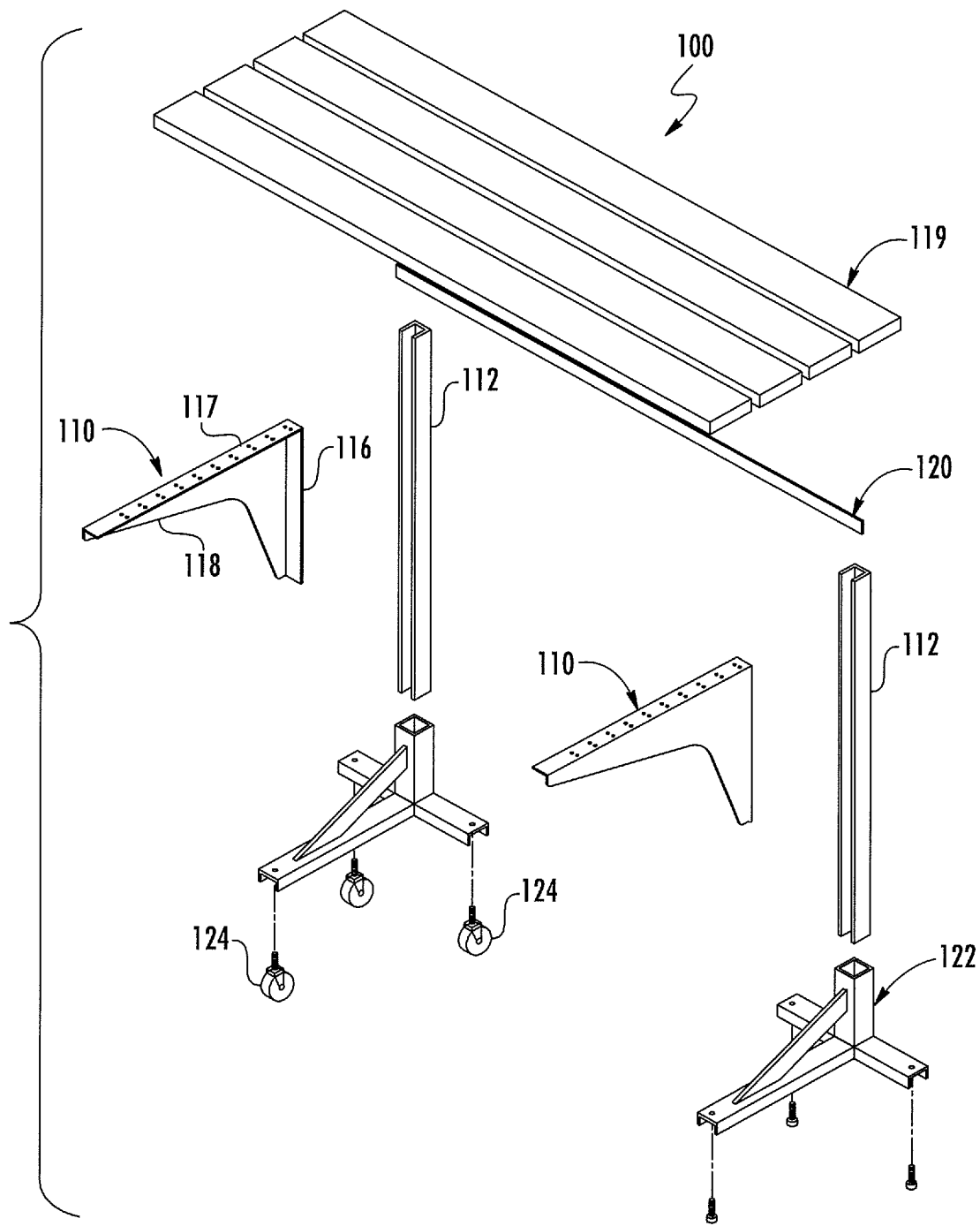
FIG. 12 is an exploded view of the freestanding embodiment of work bench of the present invention showing the unassembled parts.

An additional embodiment of the work bench of the present invention is a freestanding work bench. An example of the freestanding work bench 100 is shown in FIG. 10. The freestanding work bench 100 includes a pair of adjustable vertical legs 112 for the self-supporting framework by which the frames 110 will attach. The legs 112 are supported sleeve 120. As shown in FIGS. 11 and 12, the workbench frame 110 comprises: vertical flange 116, top flange 117, and frame support member 108. Attached to the frame support member 108 are leg support sleeve (not shown) and cross-member hanger (not shown). As normally used the work bench includes two frames 110. The work bench frames 110 use the same components in the same manner as the frames 10. The right and left bench frames 110 are interchangeable. The work bench frames 110 are the support by which the work surface 119 is attached. The work bench frames 110 connect to legs 112 via clips and the horizontal slots in the same manner as that of the wall mounted frames. A horizontal leg stabilizer 118 is connected to both vertical legs 112 using the cross-member hangers. Leg stabilizer 118 drops into the cross-member hangers allowing attachment thereby providing lateral stability to the work bench.

As shown in FIG. 12 the legs are supported by rear leg base 122. The leg tube base 122 may be fixed and provides a suitable base for stability of the work bench. Alternatively, the leg tube base 122 may have adjustable wheel casters 124 that attach to the bottom of each tube base 122 at three locations. The fixed feet and the wheel casters are interchangeable via a connection assembly on the bottom of the leg support stands. The feet and wheel casters can be adjusted up or down to compensate for irregularity in the floor or ground. In FIG. 12 the parts of work bench 100 are shown in preassembled position. For example, top flange 117 has holes to allow for connection to the work surface 119. Top flange 117 also contains small sharp tabs that provide grip to the work surface 119. The vertical flange 116 contains horizontal slots to accept the clips from legs 112 and keyhole slots for attachment to a suitable support surface. Support member 108 has a cross-member support hanger attached to it. Support member 108 also has a leg support sleeve attached to it. Atop of the top support flange 117 is a planar work surface 119. The entire work surface may be a single piece of material, e.g., wood, or may comprise several sections which fit together on the top support flange 117. As shown in FIG. 10 bench support extension 20 is used as a support for material longer than the work surface of 119. Bench support extension 20 can be connected to angle support frame 108. Bench support extension 20 is the same as that for the wall mounted embodiment.

Figure 13:
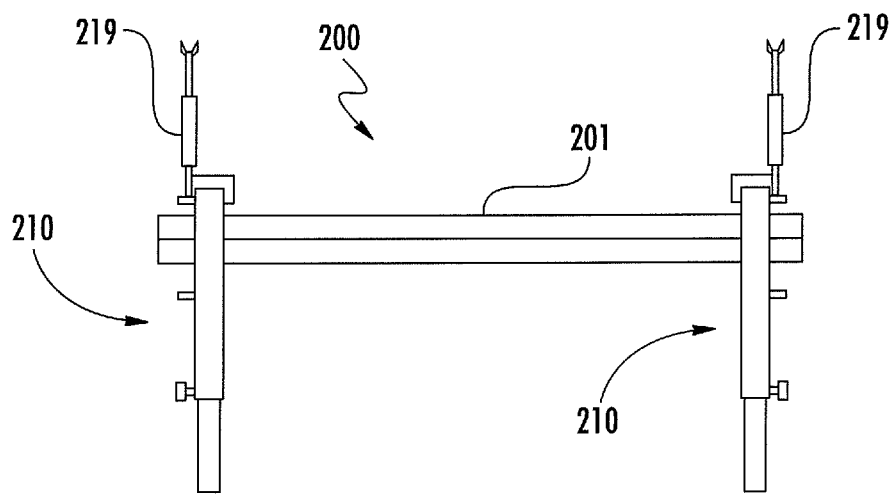
FIG. 13 is a front view of the tailgate embodiment of the work bench of the present invention.
Figure 14:
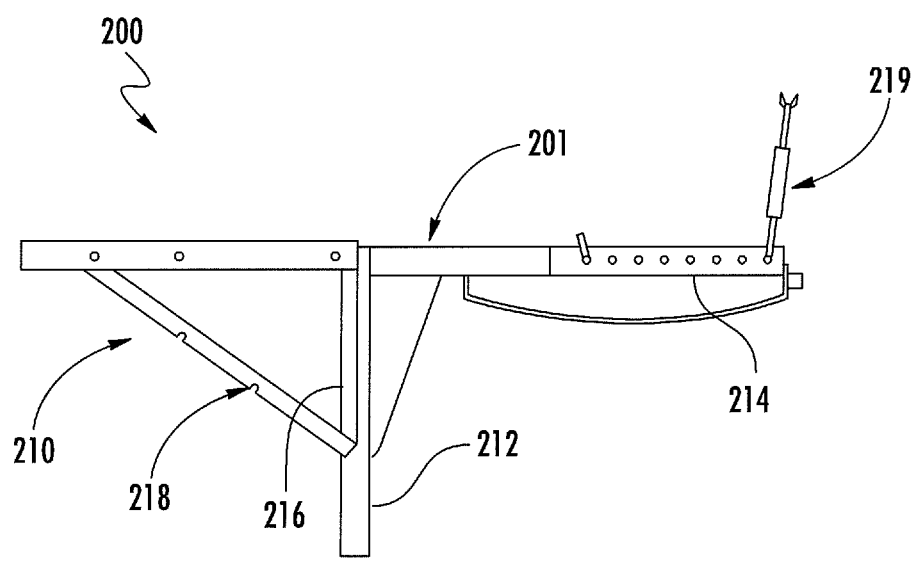
FIG. 14 is a side view of the tailgate embodiment of the work bench of the present invention.
Figure 15:
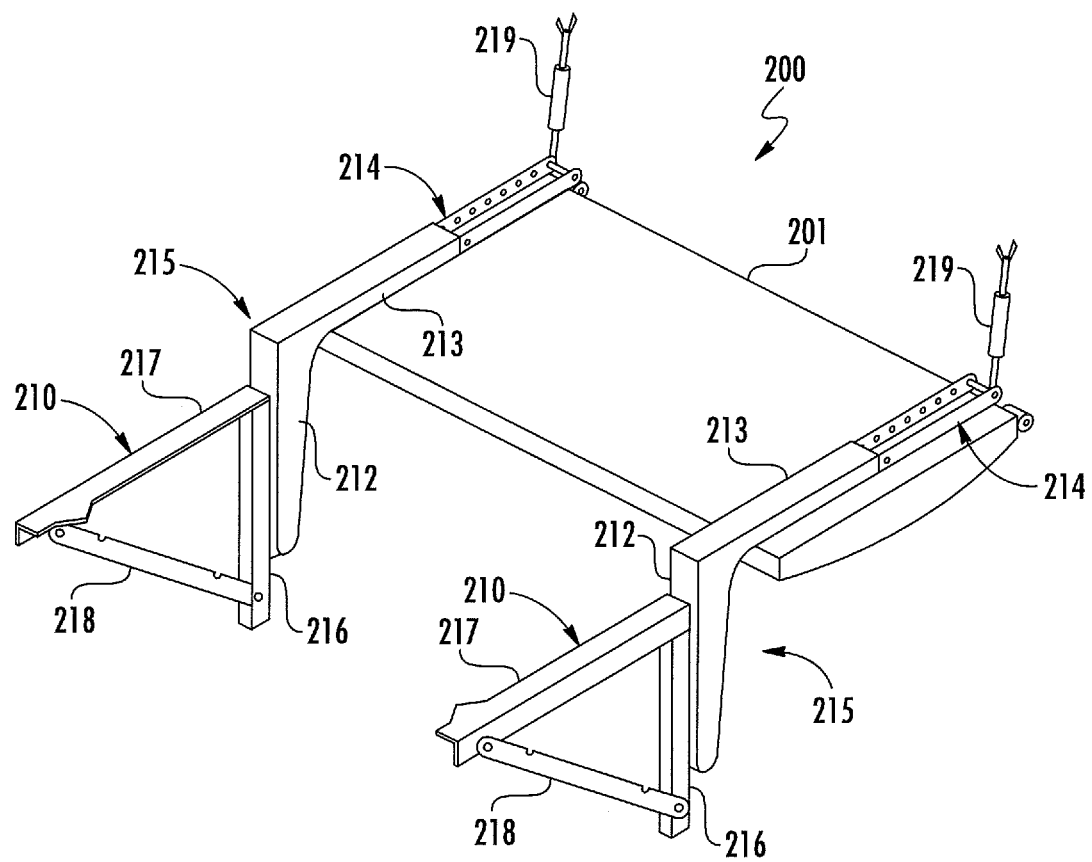
FIG. 15 is a perspective view of the tailgate embodiment of the work bench of the present invention as assembled and including a work bench extension.

There are times when one needs a work bench and the user is not at his work shop or does not have a work bench readily available for his use. For such circumstances the present invention envisions an embodiment of the work bench which is attached to the tailgate of a truck or the like. The tailgate embodiment 200 is shown in FIG. 13 wherein there is a front view of the tailgate embodiment of the workbench of the present invention. Tailgate catch receivers 214 rest on tailgate 201. A pair of work bench frames 210 are attached to the tailgate catch receivers 214 via support system brace 215. Tailgate catch receiver 214 is a tube with a series of holes that allows for the horizontal adjustment of support braces 215. This horizontal adjustment allows the assembly to be used on a variety of vehicle models tailgates. Since tailgate heights range from about 15" to 26" there is the need for horizontal adjustment. As shown in FIG. 14, each support brace 215 consists of three parts that are connected to create the support system. The first, connector 212 is the same profile as connector 112 described above but is shorter in length and connects to tailgate catch receiver 213. Connector 212 and tailgate catch receivers 213 are joined together and supported by a gusset to provide strength and stability.

The work bench frame 210 is similar to frame 10 used for the wall mounted embodiment. The right and left bench frames 210 are interchangeable. The workbench frames 210 are the support by which the bench work surface is attached. The workbench frames 210 hangs on connector 212 and allows for vertical adjustment. The tailgate catch receivers 213 of support system braces 216 are placed inside the tubes of tailgate catch receivers 214 and held in place using connector 219. The tailgate embodiment of the work bench may also include an extension 20 as described above.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A modular work bench comprising:
    a pair of spaced apart work bench mounting support standards having a repeating clip profile that allows a pair of vertically adjustable work bench frames to hang therefrom attached to a support surface;
    said pair of work bench frames comprising; a frame connector, a table top support flange and support member, said frame connector capable of being removably connected to said mounting support standards,
    a cross-member connected to each work bench frame for support;
    a vertically adjustable freestanding support leg attached to each of said work bench frames; and
    a planer work surface removably connected to said table top support flange.

2. The work bench according to claim 1 further comprising a bench support extension mounted to one of said work bench frames adapted to support material longer than said planer work surface.

3. The work bench according to claim 1 wherein said mounting support standards are attached to a vertical surface.

4. The work bench according to claim 1 wherein each of said freestanding, support legs has fixed feet attached to the bottom of each leg.

5. A freestanding modular workbench comprising:
    a pair of spaced apart mounting support standards each attached to a pair of freestanding vertical supports, said mounting support standards capable of providing vertical adjustment of a pair of work bench frames;
    said pair of work bench frames comprising; a frame connector, a table top support flange and a support member;
    a planer work surface removably connected to said table top support flange; and
    a bench support extension mounted to one of said frames adapted to support material larger than said planer work surface.

6. The work bench according to claim 5 wherein said pair of freestanding vertical supports has a wheel attached to the bottom of each of said freestanding vertical supports.

7. A modular work bench comprising:
    a pair of spaced apart work bench tailgate catch receivers attached to the inside of a tailgate;
    a work bench frame attached to each of said tailgate catch receivers via a support brace, each of said tailgate catch receivers having a series of holes that allows for the horizontal adjustment of said support braces;
    said work bench frames comprising; a frame connector, a table top support flange and support member, said frame connector capable of being removably connected to said tailgate receivers; and
    a planer work surface removably connected to said table top support flange.

* * * * *